(12) United States Patent
Yang et al.

(10) Patent No.: US 10,113,023 B2
(45) Date of Patent: Oct. 30, 2018

(54) ANTISTATIC POLYMERS AND METHODS OF MAKING THE SAME

(71) Applicant: 3M INNOVATIVE PROPERTIES COMPANY, St. Paul, MN (US)

(72) Inventors: Yu Yang, Eden Prairie, MN (US); Jason M. Kehren, Stillwater, MN (US); Suresh S. Iyer, Woodbury, MN (US); William M. Lamanna, Stillwater, MN (US); Thomas P. Klun, Lakeland, MN (US); Jeffrey A. Peterson, Hugo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/532,890

(22) PCT Filed: Dec. 8, 2015

(86) PCT No.: PCT/US2015/064392
§ 371 (c)(1),
(2) Date: Jun. 2, 2017

(87) PCT Pub. No.: WO2016/099996
PCT Pub. Date: Jun. 23, 2016

(65) Prior Publication Data
US 2017/0362362 A1    Dec. 21, 2017

Related U.S. Application Data

(60) Provisional application No. 62/092,563, filed on Dec. 16, 2014.

(51) Int. Cl.
*C08F 220/38* (2006.01)

(52) U.S. Cl.
CPC ...... *C08F 220/38* (2013.01); *C08F 2220/387* (2013.01)

(58) Field of Classification Search
USPC ........................................ 526/243; 430/270.1
See application file for complete search history.

(56) References Cited

U.S. PATENT DOCUMENTS

| | | | |
|---|---|---|---|
| 3,641,199 A | 2/1972 | Niederhauser | |
| 3,700,643 A | 10/1972 | Smith | |
| 3,887,450 A | 6/1975 | Gilano | |
| 3,895,949 A | 7/1975 | Akamatsu | |
| 3,931,117 A | 1/1976 | Leonard | |
| 6,372,829 B1 | 4/2002 | Lamanna | |
| 6,495,243 B1 | 12/2002 | Malhotra | |
| 6,592,988 B1 | 7/2003 | Thompson | |
| 6,706,920 B2 | 3/2004 | Lamanna | |
| 6,740,413 B2 | 5/2004 | Klun | |
| 6,784,237 B2 | 8/2004 | Thompson | |
| 6,924,329 B2 | 8/2005 | Klun | |
| 7,361,706 B2 | 4/2008 | Thompson | |
| 7,678,941 B2 | 3/2010 | Savu | |
| 8,449,970 B2 * | 5/2013 | Pellerite | C08J 7/047 264/291 |
| 2003/0114560 A1 * | 6/2003 | Yang | C08K 5/0075 524/154 |
| 2011/0021691 A1 * | 1/2011 | Chiang | C07C 219/08 524/521 |
| 2012/0288675 A1 | 11/2012 | Klun | |

FOREIGN PATENT DOCUMENTS

| | | | | |
|---|---|---|---|---|
| CN | 101768884 | | 7/2010 | |
| EP | 2 453 293 A1 | | 5/2012 | |
| EP | 2453293 A1 * | | 5/2012 | ........... C08F 220/34 |
| FR | 2976486 | | 12/2012 | |
| JP | 2005-120158 | | 5/2005 | |
| JP | 2006-036885 | | 2/2006 | |
| JP | 2007-009042 | | 1/2007 | |
| JP | 2009-091390 | | 4/2009 | |
| JP | 2009-144051 | * | 7/2009 | |
| JP | 2009-144051 A | * | 7/2009 | |
| JP | 2012-057110 | | 3/2012 | |
| WO | WO 2011-031442 | | 3/2011 | |
| WO | WO 2013-166198 | | 11/2013 | |
| WO | WO 2016-099948 | | 6/2016 | |
| WO | WO 2016-099995 | | 6/2016 | |

OTHER PUBLICATIONS

International Search Report for PCT International Application No. PCT/US2015/064392, dated Mar. 17, 2016, 4 pages.

* cited by examiner

*Primary Examiner* — Mark Kaucher
*Assistant Examiner* — Henry Hu
(74) *Attorney, Agent, or Firm* — Bradford B. Wright

(57) ABSTRACT

Antistatic polymers include divalent segments having the formulas (I) and (II) and wherein $R^1$ represents an alkyl group having from 1 to 18 carbon atoms, $R^2$ and $R^3$ represent alkyl groups having from 1 to 4 carbon atoms, $R^4$ represents an alkylene group having from 2 to 8 carbon atoms, and $R^5$ independently represents H or methyl. Methods of making antistatic polymers are also disclosed.

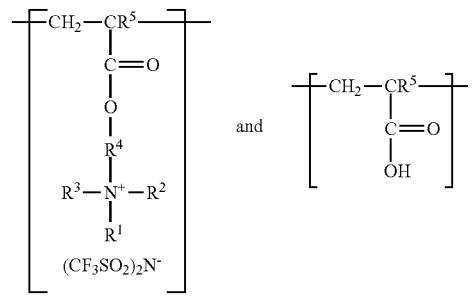

12 Claims, No Drawings

ANTISTATIC POLYMERS AND METHODS OF MAKING THE SAME

TECHNICAL FIELD

The present disclosure broadly relates to antistatic polymers and methods of making them.

BACKGROUND

Antistats or antistatic agents are used to dissipate electrostatic or static charge. Electrostatic charge buildup is responsible for a variety of problems in the processing and the use of many industrial products and materials. Electrostatic charging can cause materials to stick together or to repel one another. In addition, static charge buildup can cause objects to attract dirt and dust that can lead to fabrication or soiling problems and can impair product performance. Sudden electrostatic discharges from insulating objects can also be a serious problem. When flammable materials are present, a static electric discharge can serve as an ignition source, resulting in fires and/or explosions.

Electrostatic charge is a particular problem in the electronics industry, because modern electronic devices are extremely susceptible to permanent damage by electrostatic discharges. The buildup of electrostatic charge on insulating objects is especially common and problematic under conditions of low humidity and when liquids or solids move in contact with one another (tribocharging).

Static charge build-up can be controlled by increasing the electrical conductivity of a material. This can be accomplished by increasing ionic or electronic conductivity. The most common means of controlling static accumulation today is by increasing electrical conductivity through moisture adsorption. This is commonly achieved by adding moisture to the surrounding air (humidification) or by the use of hygroscopic antistatic agents, which are generally referred to as humectants because they rely on the adsorption of atmospheric moisture for their effectiveness. Most antistatic agents operate by dissipating static charge as it builds up; thus, static decay rate and surface conductivity are common measures of the effectiveness of antistatic agents. Antistatic agents can be applied to the surface (external antistatic agent) or incorporated into the bulk (internal antistatic agent) of the otherwise insulating material. Internal antistatic agents are commonly employed in polymers such as plastics.

Generally, internal antistatic agents fall into one of the following classes: (1) ones that are mixed directly into a molten polymer during melt processing; (2) ones that are mixed into a polymer solution, coated, and dried, or (3) ones that dissolve into a monomer (with or without a solvent) that is subsequently polymerized.

Antistatic agents are known and used over a broad range of chemical classes, including organic amines and amides, esters of fatty acids, organic acids, polyoxyethylene derivatives, polyhydric alcohols, metals, carbon black, semiconductors, and various organic and inorganic salts. Many are also surfactants and can be neutral or ionic in nature. Many low molecular weight, neutral antistatic agents have sufficiently high vapor pressures and thus are unsuitable for use at high temperatures (e.g., polymer melt processing) due to material losses that occur via evaporation. Many other neutral antistatic agents have insufficient thermal stability to survive polymer melt processing or other high temperature processing conditions.

Most non-metallic antistatic agents are generally humectants that rely on the adsorption and conductivity of water for charge dissipation. Thus, their effectiveness is typically diminished at low atmospheric humidity. Because many of these antistatic agents are also water-soluble, they are easily removed by exposure of the material to water (e.g., washing) and therefore are not very durable.

Metal salts of inorganic, organic, and fluoroorganic anions are also useful as antistatic agents in certain polymer compositions. Alkali metal salts are most commonly used due to cost and toxicity considerations and to the high affinity of alkali metal cations, especially lithium, for water. However, most metal salts are not compatible with polymers of moderate to low polarity, such as polypropylene, polyester, and polycarbonate. This incompatibility can result in inadequate antistatic agent performance and/or an unacceptable reduction in physical properties or transparency in a finished polymeric article. Consequently, the use of metal salts as internal antistatic agents is generally limited to highly polar and/or hydrophilic polymer matrices.

SUMMARY

There is a continuing need for antistatic agents, and especially antistatic agents that can be incorporated into coatings and polymer melt compositions.

The present inventors have discovered that the chemical group

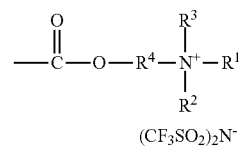

when incorporated in various polymers having hydrophilic groups can impart at least a degree of antistatic properties to the polymers.

In a first aspect, the present disclosure provides an antistatic polymer comprising:

divalent segments p) represented by the formula

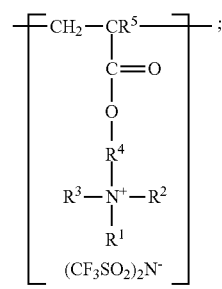

wherein $R^1$ independently represents an alkyl group having from 1 to 18 carbon atoms, $R^2$ and $R^3$ independently represent alkyl groups having from 1 to 4 carbon atoms, $R^4$ independently represents an alkylene group having from 2 to 8 carbon atoms, and $R^5$ independently represents H or methyl;

divalent segments q) represented by the formula

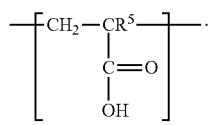

In a second aspect, the present disclosure provides a method of making an antistatic polymer comprising free-radically copolymerizing monomers comprising:

monomer p) represented by the formula

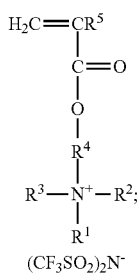

wherein
$R^1$ independently represents an alkyl group having from 1 to 18 carbon atoms,
$R^2$ and $R^3$ independently represent alkyl groups having from 1 to 4 carbon atoms,
$R^4$ independently represents an alkylene group having from 2 to 8 carbon atoms, and
$R^5$ independently represents H or methyl;
monomer q) represented by the formula

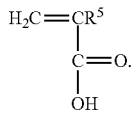

Features and advantages of the present disclosure will be further understood upon consideration of the detailed description as well as the appended claims.

DETAILED DESCRIPTION

Antistatic polymers according to the present disclosure can be prepared by free-radical copolymerization of acrylic monomers including: acrylic acid and/or methacrylic acid, and a monomer represented by the formula:

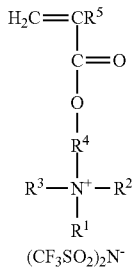

$R^1$ independently represents an alkyl group having from 1 to 18 carbon atoms, preferably 1 to 10 carbon atoms. In some preferred embodiments, $R^1$ has from 1 to 4 carbon atoms. In other preferred embodiments, $R^1$ has from 6 to 12 carbon atoms. Examples include hexyl, heptyl, octyl, isooctyl, nonyl, decyl, dodecyl, hexadecyl, and octadecyl groups.

$R^2$ and $R^3$ independently represent alkyl groups having from 1 to 4 carbon atoms, preferably 1 or 2 carbon atoms. Examples include, methyl, ethyl, propyl, isopropyl, and butyl groups.

$R^4$ independently represents an alkylene group having from 2 to 8 carbon atoms, preferably 2 to 4 carbon atoms. Examples include ethyl, propyl, isopropyl, butyl, pentyl, hexyl, cyclohexyl, heptyl, octyl, and isooctyl groups.

$R^5$ independently represents H or methyl, preferably H.

Acrylic monomers such as shown above can be prepared, for example by reaction of acryolyl chloride or methacryloyl chloride and an ionic alcohol. Suitable ionic alcohols contain a quaternary ammonium bis(trifluoromethanesulfonyl) imide salt, and may be prepared according to known methods; for example, according to methods described in U.S. Pat. No. 6,706,920 B2 (Lamanna et al.). For example, Example 1 of that patent describes the preparation of octyldimethyl-2-hydroxyethylammonium bis(trifluoromethanesulfonyl)imide.

In some embodiments, additional free-radically polymerizable monomers (preferably monofunctional monomers such as e.g., monoacrylates, monomethacrylates, monoacrylamides, and monomethacrylamides) may be included in amounts of from 1 to 99 percent by weight, preferably less than 50 percent by weight, and more preferably less than 20 percent by weight. Examples include methyl acrylate, methyl methacrylate, ethyl acrylate, isopropyl methacrylate, isooctyl acrylate, acrylic acid, n-hexyl acrylate, stearyl acrylate, allyl acrylate, isobornyl acrylate, isobornyl methacrylate, acrylic acid, N-vinylcaprolactam, acrylonitrile, allyl acrylate, glycerol monoacrylate, 2-hydroxyethyl acrylate, 2-phenoxyethyl acrylate, monoacrylates and monomethacrylates of polyethylene glycols of molecular weight of 200 to 500 g/mol (although these may be prone to forming gels), butyl acrylate, tetrahydrofurfuryl acrylate, and N-vinylpyrrolidone.

In some embodiments, it may be desirable to include polyfunctional acrylates or methacrylates, although this will result in a crosslinked polymer that may not be suitable for coating. Examples include polyethylene glycol diacrylate, polypropylene glycol methacrylate, trimethylolpropane triacrylate, and glycerol triacrylate.

These ethylenically-unsaturated acrylic monomers polymerize or cure by a free-radical polymerization mechanism. This polymerization is initiated by a free-radical source and can be generated by electron beam radiation or by an initiator. If an initiator is included, then a free-radical source can be generated by exposing the initiator to either heat or a radiation energy source. Examples of radiation energy sources include electron beam, ultraviolet light or visible light. Examples of suitable initiators include thermal initiators such as peroxides (e.g., dicumyl peroxide, 2,5-dimethyl-2,5-di(t-butylperoxy)hexane, di-t-butyl peroxide, t-butylperoxy benzoate, and lauryl peroxide), azo compounds (e.g., azobis(isobutyronitrile), and photoinitiators. Examples of suitable photoinitiators that may generate a free-radical source when exposed to ultraviolet light radiation energy include quinones, benzophenones, nitroso compounds, acryl halides, hydrazones, benzoin ethers, benzil ketals, thioxanthones, and acetophenone derivatives. Additional references to free-radical photoinitiator systems for ethylenically unsaturated compounds are included in U.S. Pat. No. 3,887,450 (Gilano et al.) and U.S. Pat. No. 3,895,949 (Akamatsu et al.). In general, an effective amount of the free-radical initiator should be used for polymerization; typically, an amount less than 10 percent by weight, preferably less than 5 percent by weight, and more preferably less than 2 percent by weight. Methods for free-radical copolymerization of free-radically polymerizable monomers are well-known.

The resultant copolymer comprises divalent segments p) represented by the formula

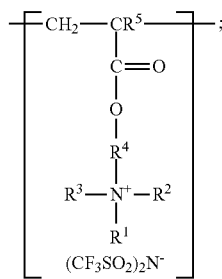

and divalent segments q) represented by the formula

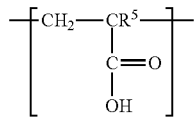

wherein $R^1$ to $R^5$ are as previously defined.

While divalent segments p) and q) (resulting from corresponding amounts of the corresponding monomers) may be present in any ratio (e.g., 1:99 to 99:1), on a molar basis the ratio of divalent segment p) to divalent segment q) is preferably from 5:1 to 15:1.

If desired, antistatic polymers according to the present disclosure can be combined with one or more conventional additives commonly used in the art such as, for example, dyes, pigments, antioxidants, ultraviolet stabilizers, flame retardants, surfactants, plasticizers, tackifiers, fillers, and mixtures thereof to provide an antistatic composition. In particular, performance enhancers (for example, polymers such as polybutylene) can be utilized to improve the antistatic characteristics in, for example, melt additive polyolefin applications.

Antistatic polymers according to the present disclosure can be used in coating compositions (e.g., as dissolved or dispersed in water and/or organic solvent) or with various insulating (e.g., dielectric) materials (i.e., coated directly onto an insulating material) provided these antistatic polymers are compatible with the coating and/or insulating materials. Thus, the antistatic polymer preferably performs well as an antistat and does not adversely affect other properties of the coating and/or insulating materials.

Antistatic polymers according to the present disclosure may comprise about 0.1 to about 50 weight percent of an antistatic coating composition, based on the solids in the coating composition.

Antistatic coating compositions including an antistatic polymer according to the present disclosure can be applied from aqueous or organic solvents (including solutions of binders) to a variety of insulating materials including, for example, fabric, fibers, electronic components, electronic packaging, compact discs, and molded or blown objects (e.g., surgical gowns). The coating composition is preferably water-based, but may contain organic solvent. In some embodiments, the coating composition is solvent-based. Examples of solvents include ethers, esters, ketones, and alcohols.

Insulating materials that are suitable for topical treatment include materials that have relatively low surface and bulk conductivity and that are prone to static charge build-up. These materials include both synthetic and naturally-occurring polymers (or the reactive precursors thereof, for example, mono- or multifunctional monomers or oligomers) that can be either organic or inorganic in nature, as well as ceramics, glasses, and ceramic/polymer composites, ceramers, or the reactive precursors thereof.

Insulating materials that are suitable for blending with antistatic polymers according to the present disclosure may include thermoplastic polymers and thermosetting compositions, for example. Suitable synthetic polymers (which can be either thermoplastic or thermoset) include commodity plastics such as, for example, poly(vinyl chloride), polyethylenes (high density, low density, very low density), polypropylene, polybutylene, and polystyrene; engineering plastics such as, for example, polyesters (including, for example, poly(ethylene terephthalate) and poly(butylene terephthalate), polyamides (aliphatic, amorphous, aromatic), polycarbonates (for example, aromatic polycarbonates such as those derived from bisphenol A), polyoxymethylenes, polyacrylates and polymethacrylates (for example, poly(methyl methacrylate)), some modified polystyrenes (for example, styrene-acrylonitrile (SAN) and acrylonitrile-butadiene-styrene (ABS) copolymers), high-impact polystyrenes (SB), fluoroplastics, and blends such as poly(phenylene oxide)-polystyrene and polycarbonate-ABS; high-performance plastics such as, for example, liquid crystalline polymers (LCPs), polyetherketone (PEK), polysulfones, polyimides, and polyetherimides; thermosets such as, for example, alkyd resins, phenolic resins, amino resins (for example, melamine and urea resins), epoxy resins, unsaturated polyesters (including so-called vinyl esters), polyurethanes, allylics (for example, polymers derived from allyl diglycol carbonate), fluoroelastomers, and polyacrylates; and the like and blends thereof. Suitable naturally occurring polymers include proteinaceous materials such as silk, wool, and leather; and cellulosic materials.

Thermoplastic and thermoset polymers, including those described above, are preferred insulating materials, as these polymers can either be topically treated with the antistat or can be combined with the antistat (in bulk) to form a blend. Melt processing of the antistat into a thermoplastic polymer is preferred, because it eliminates the use of hazardous solvents and volatile organic compounds (VOCs). Preferably, the thermoplastic polymers are melt-processable at elevated temperatures, for example, above about 150° C., more preferably above about 240° C., and even more preferably above about 280° C. Preferred thermoplastic polymers include, for example, polypropylene, polyethylene, polybutylene, copolymers of ethylene and one or more alpha-olefins (for example, poly(ethylene-butene) and poly(ethylene-octene)), polyesters, polyurethanes, polycarbonates, polyetherimides, polyimides, polyetherketones, polysulfones, polystyrenes, ABS copolymers, polyamides, fluoroelastomers, and blends thereof.

The antistatic polymer can also be blended with monomers, curable oligomers, or curable polymers followed by polymerization or curing to form a crosslinked thermoset polymer containing the antistat. For example, the antistatic polymers may be crosslinked through their carboxylic acid functionality by reaction with polymers or oligomers having aziridine, oxazoline, or carbodiimide functionality. Preferred thermoset polymers include polyurethanes, epoxy resins, and unsaturated polyesters.

Antistatic polymers according to the present disclosure can further be applied to an insulating material using techniques known in the art such as, but not limited to, dip coating, spray coating, swirl coating, spin coating, extrusion hopper coating, curtain coating, gravure coating, air knife coating, and the like. The coating thickness varies as a function of the insulating material.

SELECT EMBODIMENTS OF THE PRESENT DISCLOSURE

In a first embodiment, the present disclosure provides an antistatic polymer comprising: divalent segments p) represented by the formula

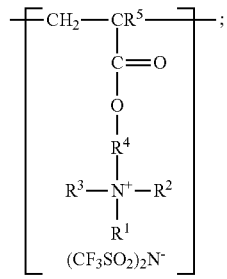

wherein
R$^1$ independently represents an alkyl group having from 6 to 18 carbon atoms,
R$^2$ and R$^3$ independently represent alkyl groups having from 1 to 4 carbon atoms,
R$^4$ independently represents an alkylene group having from 2 to 8 carbon atoms, and
R$^5$ independently represents H or methyl;
divalent segments q) represented by the formula

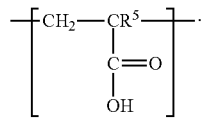

In a second embodiment, the present disclosure provides an antistatic polymer according to the first embodiment, wherein R$^1$ has from 6 to 10 carbon atoms.

In a third embodiment, the present disclosure provides an antistatic polymer according to the first or second embodiment, wherein R$^2$ and R$^3$ are independently methyl or ethyl.

In a fourth embodiment, the present disclosure provides an antistatic polymer according to any one of the first to third embodiments, wherein R$^4$ has from 2 to 4 carbon atoms.

In a fifth embodiment, the present disclosure provides an antistatic polymer according to any one of the first to fourth embodiments, wherein R$^5$ is H.

In a sixth embodiment, the present disclosure provides an antistatic polymer according to any one of the first to fifth embodiments, wherein on a molar basis the ratio of divalent segment p) to divalent segment q) is from 5:1 to 15:1.

In a seventh embodiment, the present disclosure provides a method of making an antistatic polymer comprising free-radically copolymerizing monomers comprising:
a first monomer represented by the formula

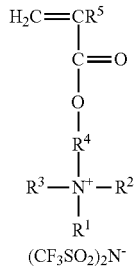

wherein
R$^1$ independently represents an alkyl group having from 6 to 18 carbon atoms,
R$^2$ and R$^3$ independently represent alkyl groups having from 1 to 4 carbon atoms,
R$^4$ independently represents an alkylene group having from 2 to 8 carbon atoms, and
R$^5$ independently represents H or methyl; and
a second monomer represented by the formula

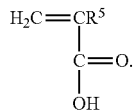

In an eighth embodiment, the present disclosure provides a method according to the seventh embodiment, wherein R$^1$ has from 6 to 10 carbon atoms.

In a ninth embodiment, the present disclosure provides a method according to the seventh or eighth embodiment, wherein R$^2$ and R$^3$ are independently methyl or ethyl.

In a tenth embodiment, the present disclosure provides a method according to any one of the seventh to ninth embodiments, wherein R$^4$ has from 2 to 4 carbon atoms.

In an eleventh embodiment, the present disclosure provides a method according to any one of the seventh to tenth embodiments, wherein R$^5$ is H.

In a twelfth embodiment, the present disclosure provides a method according to any one of the seventh to eleventh embodiments, wherein on a molar basis the ratio of the first monomer to the second monomer is from 5:1 to 15:1.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

The following designations are used in the Examples:

| DESIGNATION | DESCRIPTION and SOURCE |
|---|---|
| EPOCROS WS-500 | Oxazoline-functional polymer obtained as EPOCROS WS-500 |

| DESIGNATION | DESCRIPTION and SOURCE |
|---|---|
| | from Nippon Shokubai Co., LTD, Osaka, Japan |
| CX-100 | a 100% active, polyfunctional aziridine liquid cross-linker obtained as CROSSLINKER CX-100 from DSM NeoResins, Inc., Augusta, Georgia |
| EPON 824 Part A | liquid epoxy resin obtained as EPON 824 from Momentive Specialty Chemicals, Columbus, Ohio |
| MEK | methyl ethyl ketone |
| $CH_2$=$CHCO_2(CH_2)_2N^+(CH_3)_3$ $^-N(SO_2CF_3)_2$ | prepared according to the procedure described in [0118] of U.S. Pat. Appln. Publn. No. 2012/0288675 A1 (Klun et al.) |
| VAZO 67 | 2,2'-azobis(2-methylbutyronitrile), obtained as VAZO 67 from E. I. du Pont de Nemours and Company, Wilmington, Delaware |
| PET | Polyethylene terephthalate film, 2 mils (50 micrometers) thick from 3M Company, Saint Paul, Minnesota |

All other materials were or can be obtained from Aldrich Chemical Company, Milwaukee, Wis.

Test Method for Measuring Surface Resistivity and Volume Resistivity

Measurements were done on a Keithley 6517A/8009 Resistivity Test Fixture (obtained from Keithley Instruments, Inc., Cleveland, Ohio) using ASTM D257-07 "Standard Test Methods for DC Resistance or Conductance of Insulating Materials" "protocol. The applied voltage was 100 V. The upper limit of surface resistivity measurable by this setup is $10^{17}\Omega/\square$ (i.e., ohms per square). All tests were done under ambient conditions.

Test Method for Antistatic Testing

Static decay measurements were done on a Model 406C Electro-tech static decay meter (obtained from Electro-Tech Systems, Inc., Glenside, Pa.) using reference JKEHR008-018. Positively and negatively biased potentials of 5 kV were applied separately to each test sample, and the times required for the accumulated static charges to decay to 10% of their initial values were measured, up to a maximum of 60 sec. All tests were done under ambient conditions.

Examples 1-5

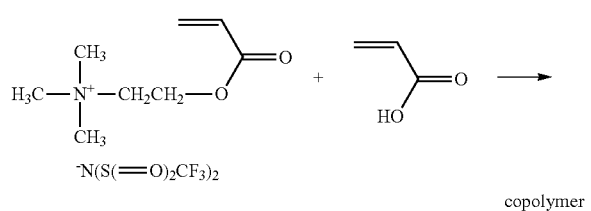

copolymer $CH_2$=$CHCO_2(CH_2)_2N^+(CH_3)_3$ $^-N(SO_2CF_3)_2$ (11 g, 0.025 mol), 1.44 g of acrylic acid (0.02 mol), 0.256 g of VAZO 67, and 19.2 g of MEK were charged into a 1-oz (30-mL) jar. The jar was purged with nitrogen for 1 minute and then sealed. The bottle was heated at 60° C. for 8 hours. A viscous solution (Solution A) was prepared.

For Example 1, 0.5 g of above Solution A was diluted by 0.5 g of MEK and mixed with 0.11 g of CX-100 and coated on PET film using #10 Mayer rod (nominal wet film thickness of 23 micrometers). The coating was baked at 120° C. for 5 minutes.

For Example 2, 0.5 g of above Solution A was diluted by 0.5 g of MEK and mixed with 0.22 g of EPOCROS WS500 and coated on PET film using #10 Mayer rod. The coating was baked at 120° C. for 5 minutes.

For Example 3, 0.5 g of above Solution A was diluted by 0.5 g of MEK and mixed with 0.11 g of EPON 824 Part A and coated on PET film using #10 Mayer rod. The hazy coating was baked at 120° C. for 5 minutes.

Solution A (5 g) was added 20 g acetone and 8 g of water and 0.2 g of triethylamine was added. Evaporation of MEK gave 20 wt. % emulsion (Solution B).

For Example 4, 1 g of Solution B was mixed with 0.22 g of EPOCROS WS500 and coated on PET film using #10 Mayer rod. The clear coating was baked at 120° C. for 5 minutes.

For Example 5, 1 g of Solution B was mixed with 0.1 g of CX-100 and coated on PET film using #10 Mayer rod. The hazy coating was baked at 120° C. for 5 minutes.

TABLE 1

| EXAMPLE | SIDE | $S_R$, ohm/sq | $V_R$, ohm-cm | STATIC DECAY, seconds | |
|---|---|---|---|---|---|
| | | | | +5 kV | −5 kV |
| 1 | A | $3.6 \times 10^{13}$ | $8 \times 10^{14}$ | >60 | >60 |
| | B | $4 \times 10^{14}$ | $9 \times 10^{14}$ | — | — |
| 2 | Coated | $1 \times 10^{13}$ | $2 \times 10^{15}$ | 23.31 | 22.86 |
| | Uncoated | $1 \times 10^{15}$ | $1 \times 10^{15}$ | | |
| 3 | Coated | $4.3 \times 10^{12}$ | $1 \times 10^{17}$ | 7.86 | 7.79 |
| | Uncoated | $3 \times 10^{15}$ | $1 \times 10^{15}$ | | |
| 4 | Coated | $6.1 \times 10^{12}$ | $3 \times 10^{15}$ | 11.37 | 11.54 |
| | Uncoated | $3 \times 10^{15}$ | $3 \times 10^{15}$ | | |
| 5 | Coated | $1.0 \times 10^{12}$ | $1.4 \times 10^{15}$ | 5.55 | 5.57 |
| | Uncoated | $4 \times 10^{15}$ | $5 \times 10^{15}$ | | |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. An antistatic polymer consisting of:
divalent segments p) represented by the formula

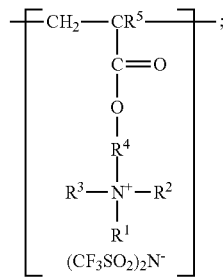

wherein
$R^1$ independently represents an alkyl group having from 1 to 18 carbon atoms,
$R^2$ and $R^3$ independently represent alkyl groups having from 1 to 4 carbon atoms,
$R^4$ independently represents an alkylene group having from 2 to 8 carbon atoms, and
$R^5$ independently represents H or methyl; and
divalent segments q) represented by the formula)

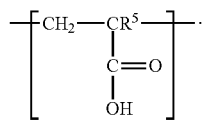

2. The antistatic polymer of claim 1, wherein $R^1$ has from 6 to 10 carbon atoms.

3. The antistatic polymer of claim 1, wherein $R^2$ and $R^3$ are independently methyl or ethyl.

4. The antistatic polymer of claim 1, wherein $R^4$ has from 2 to 4 carbon atoms.

5. The antistatic polymer of claim 1, wherein $R^5$ is H.

6. The antistatic polymer of claim 1, wherein on a molar basis the ratio of divalent segment p) to divalent segment q) is from 5:1 to 15:1.

7. A process of making an antistatic polymer comprising free-radically copolymerizing monomers consisting of:

a first monomer represented by the formula

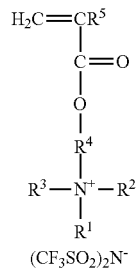

wherein
$R^1$ independently represents an alkyl group having from 1 to 18 carbon atoms,
$R^2$ and $R^3$ independently represent alkyl groups having from 1 to 4 carbon atoms,
$R^4$ independently represents an alkylene group having from 2 to 8 carbon atoms, and
$R^5$ independently represents H or methyl; and a second monomer represented by the formula

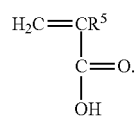

8. The process of claim 7, wherein $R^1$ has from 6 to 10 carbon atoms.

9. The process of claim 7, wherein $R^2$ and $R^3$ are independently methyl or ethyl.

10. The process of claim 7, wherein $R^4$ has from 2 to 4 carbon atoms.

11. The process of claim 7, wherein $R^5$ is H.

12. The process of claim 7, wherein on a molar basis the ratio of the first monomer to the second monomer is from 5:1 to 15:1.

* * * * *